United States Patent [19]
Burden, Jr. et al.

[11] 3,749,030
[45] July 31, 1973

[54] HEATING AND EXHAUST EMISSION CONTROL SYSTEM AND METHOD FOR MATERIAL DRYERS

[75] Inventors: Roy B. Burden, Jr., Sherwood; Ernest J. O'Gieblyn, Portland, both of Oreg.

[73] Assignee: Wasteco, Inc., Tualatin, Oreg.

[22] Filed: Nov. 8, 1971

[21] Appl. No.: 196,506

[52] U.S. Cl.................... 110/8 R, 34/68, 110/8 A
[51] Int. Cl. ............................................. F23g 7/00
[58] Field of Search .................. 110/8 R, 8 A, 18 R; 34/68

[56] References Cited
UNITED STATES PATENTS

| | | | |
|---|---|---|---|
| 3,486,841 | 12/1969 | Betz | 34/68 X |
| 3,675,600 | 7/1972 | Jones | 110/8 |
| 3,601,900 | 8/1971 | Erisman et al. | 110/8 |

*Primary Examiner*—Kenneth W. Sprague
*Attorney*—Stephen W. Blore, James S. Leigh et al.

[57] ABSTRACT

Heat generated within an incinerator is transferred to oil in a combustion gas-to-oil heat exchanger. The hot oil is circulated through a radiator in a material dryer to heat air used as the drying medium. The hot air passing in contact with the material to be dried picks up particulate solids and gases which heretofore have been exhausted to atmosphere. These gas-borne waste emissions are, in accordance with the invention, confined and conducted to the combustion chamber of the incinerator where they are burned, thus becoming a source of heat for the dryer.

2 Claims, 1 Drawing Figure

PATENTED JUL 31 1973 3,749,030
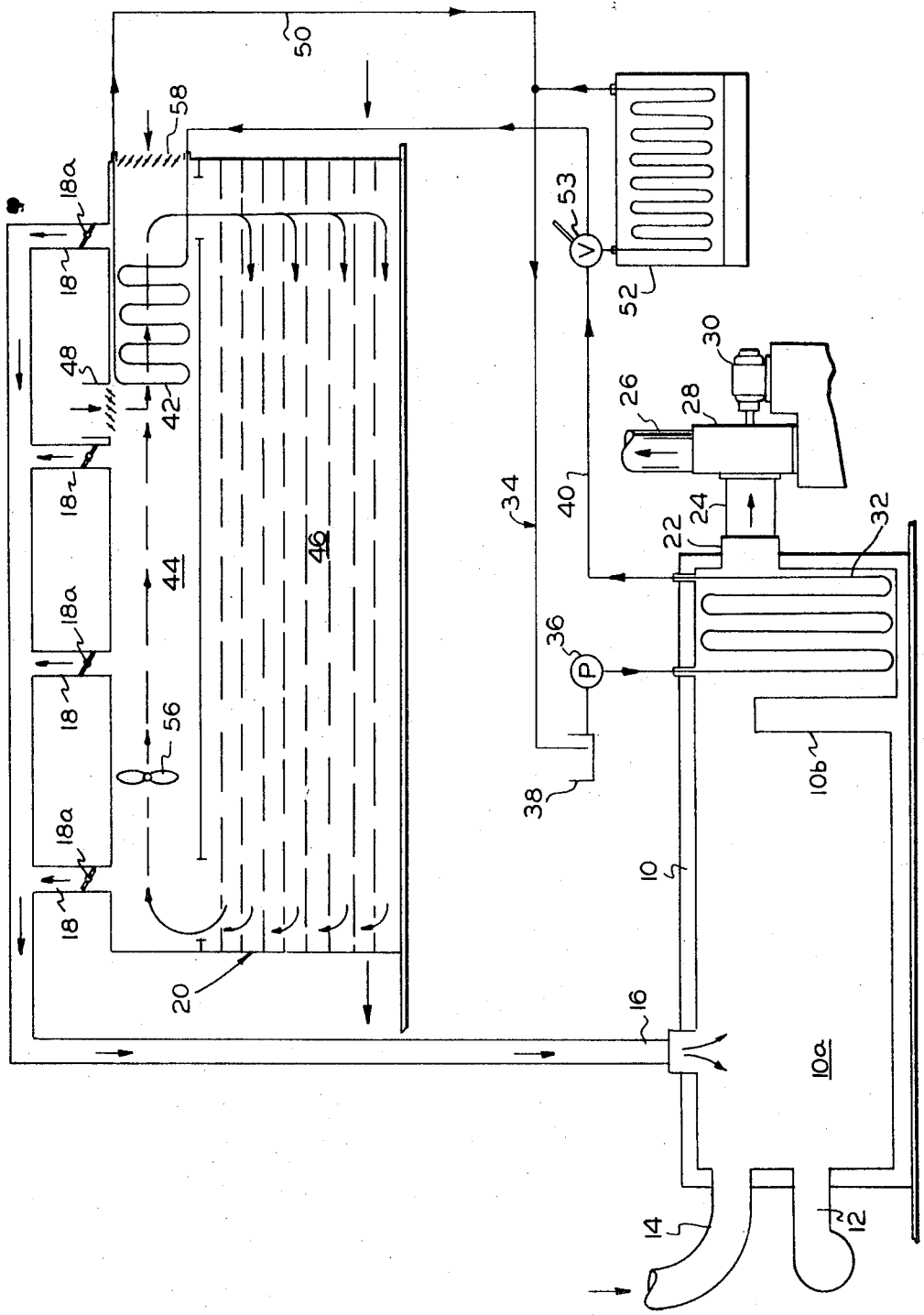
ROY B. BURDEN, JR.
ERNEST J. O'GIEBLYN
INVENTORS.
BY
BUCKHORN, BLORE, KLARQUIST & SPARKMAN
ATTORNEYS

HEATING AND EXHAUST EMISSION CONTROL SYSTEM AND METHOD FOR MATERIAL DRYERS

BACKGROUND OF THE INVENTION

1. Field of the Invention

The present invention relates to dryers and more particularly to a method of and system for heating such dryers and controlling the exhaust emissions therefrom so as to prevent air pollution problems.

2. Description of the Prior Art

In typical dryers of the type wherein hot air is passed in contact with the material to be dried, the air circulating through the dryer tends to pick up the finer particulate solids associated with the material as well as gaseous byproducts of the drying process. Heretofore these waste gases and gas-borne solids have simply been exhausted to atmosphere, creating air pollution problems. In veneer and rotary dryers used in the plywood industry, the fine sander dust picked up in the gas stream is highly combustible and tends to be at least partially incinerated by the hot air even while in the dryer itself, intensifying the air pollution problem because of the presence of dense smoke in the emissions. The same problem exists in many other material-drying applications.

With many governmental regulatory agencies now enacting and enforcing stringent sanitary codes to protect the environment, a grave need has developed for an efficient, economical and workable method of reducing waste emissions from various types of material dryers to acceptable levels which will satisfy existing and foreseeable future air pollution codes.

SUMMARY OF THE INVENTION

The method and system of the present invention not only meet the foregoing need for providing an efficient, economical and workable method and means for controlling exhaust emissions from material dryers, but also provides a surprisingly efficient and economical system and method of heating such dryers.

Principal features of the invention include a method and system which:

1. control, if not prevent altogether, exhaust waste emissions from material dryers;
2. control such emissions in an economical, efficient manner;
3. utilize the combustible waste emissions from dryers as a fuel to generate heat for heating the drying medium;
4. enable the use of various types and sources of fuel including many different types of waste as a source of heat for the dryer;
5. include a hot oil or other liquid circulation system for transferring heat from a furnace at least partially fueled by waste emissions from the dryer, to the drying medium;
6. include a combustion gas-to-oil heat exchanger as part of the furnace for generating heat for the dryer;
7. include an oil-to-air radiator at the drying unit for transferring heat from the oil or other liquid heating medium to the air or other drying medium within the dryer; and
8. with the foregoing features thus provide a closed heating and exhaust emission control system adaptable to many differnt types of material dryers and furnaces.

BRIEF DESCRIPTION OF THE DRAWINGS

The foregoing objects, features and advantages of the invention will become more apparent from the following detailed description which proceeds with reference to the accompanying drawings wherein the single FIG. 1 is a diagram of a typical incinerator-dryer system in accordance with the invention.

DETAILED DESCRIPTION

The incinerator-dryer system may be adapted for use with numerous different types of burners, afterburners and incinerators, with various types of dryers and in conjunction with the drying of innumerable different types of materials. It is to be understood, therefore, that the illustrated system, incorporating a waste material afterburner and a wood veneer dryer, is simply an example of one typical application of the invention. Other examples would include applications to lumber dryers, rotary dryers, dehydrators, and dry kilns of various sorts. No doubt numerous other applications will occur to persons skilled in the art from a reading of this specification.

The system is suited for application to any type of dryer which produces as a byproduct combustible gaseous or solid particulate wastes which would normally create a disposal and pollution problem. A particularly suitable application is in the wood-processing industry where combustible waste byproducts of lumber and plywood mills, including bark, chips, sander and saw dust, and hydrocarbons are normally produced in vast quantities. These mills also utilize veneer and lumber dryers in which such byproducts create emission problems.

With reference to the drawing, a waste incinerator, or afterburner, 10 includes an auxiliary fuel burner 12 capable of burning oil, natural gas, propane or another auxiliary fuel supplied from a remote source (not shown). The afterburner also includes a waste or other fuel inlet pipe 14 which may supply, for example, waste material to be burned from various points in a lumber or plywood mill. The illustrated afterburner also includes a material supply pipe 16 leading into the afterburner's combustion chamber from various exhaust outlets 18 of a typical veneer dryer 20. The afterburner also includes a combustion gas outlet 22 through which the products of combustion flow to a passage 24 leading to an exhaust stack 26 or to gas cleansing devices such as a gas scrubber, or afterburner. An induced draft fan 28 driven by motor 30 draws the products of combustion from the afterburner to the stack or other air pollution control equipment.

Within afterburner 10 but separated from its combustion chamber 10a by an interior baffle 10b is a gas-to-oil heat exchanger 32. This heat exhcanger is part of an oil circuit indicated generally at 34 which passes between the afterburner and the dryer. Oil circuit 34 includes a pump 36 which pumps oil from reservoir 38 toward heat exchanger 32. Oil heated in the heat exchanger pipes by the hot combustion gases from the afterburner flows through oil line 40 toward the dryer. Oil in line 40 flows into an oil-to-air heat exchanger or radiator 42 within a plenum 44 of dryer 20. Thus air circulating through the material-carrying portion 46 of the dryer after returning to the plenum and also make-up air entering the dryer plenum through louvered air inlet 48 passes through the radiator to become heated before flowing into contact with the moving decks of veneer within the lower drying chamber 46.

After giving up heat in the dryer plenum, the oil flows from radiator 42 back through line 50 of the oil circuit to reservoir 38 from which it is pumped back to heat exchanger 32 within afterburner 10.

Preferably the oil circuit also includes a heat sink 52 to which all or part of the hot oil flow may be shunted to dissipate heat before returning to the reservoir while bypassing the dryer if desired, such as when the dryer is shut down for maintenance. For this purpose a valve 53 is provided in oil line 40 to direct flow either to the dryer or to the heat sink as required.

Typically, dryer plenum 44 would be equipped with a fan 56 for inducing circulation of air through the lower material-carrying chamber of the dryer. Return air from lower chamber 46 passing upwardly to the plenum and laden with moisture would normally be at least partially vented to atmosphere through exhaust stacks 18, with dampers 18a controlling the rate of exhaust. However, such circulating hot air picks up large quantities of sander dust and hydrocarbons as it passes in contact with the veneer, creating an air pollution problem. However, in accordance with the invention, such waste byproducts of the dryer are fed to the afterburner 10 by manifolding the exhaust stacks 18 to the feed pipe 16. There the combustible gases and particulate solids are incinerated and the resulting heat transferred to the heat exchanger 32 to heat the oil which circulates heat to the dryer. Thus in effect a completely closed incinerating and drying system is disclosed which not only provides an economical source of heat for the dryer, but also solves in an economical manner what would otherwise be a serious air pollution problem created by the dryer emissions.

In a veneer dryer application typically the radiator coils would heat the incoming air to a temperature of approximately 450° F., with the air and other gases returning to the afterburner being at a reduced temperature of 300° F. or below. Temperatures within the afterburner itself would likely be in excess of 1,250° F., with the heat exchanger heating the oil to a temperature of approximately 680° F. These, of course, are merely examples of typical temperatures that would be encountered in the burner-dryer system disclosed. Temperatures within the dryer itself, of course, could be modulated through controlling the amount of make-up air entering at 48 and also the amount of cooling air entering downstream of the radiator coils 42, such as at louvered opening 58.

While hot oil is described as the preferred thermal fluid, other suitable thermal fluids might be used. However, oil has the advantage of being non-corrosive and the capability of being readily pumped in a liquid state at high temperatues and high flow rates and yet at low pressure. Use of oil therefore avoids the need of moving large volumes of heating medium through large conduits to supply the necessary heat to the dryer.

Having described a typical preferred embodiment and application of the invention, it should be apparent to those skilled in the art that the invention permits of modification in arrangement, detail and application. We claim as our invention all such modifications as come within the true spirit and scope of the following claims.

We claim:

1. An incinerator-dryer heat exchange system comprising:

incinerator means including a combustion chamber, material dryer means, including means for passing a drying medium through said dryer means, liquid circuit means including pump means for circulating a liquid heating medium within said circuit means, said circuit means including:

gas-to-liquid heat exchanger means at said incinerator means for transferring heat from the gaseous products of combustion of said incinerator means to said liquid heating medium, and radiator means at said dryer means for transferring heat from said liquid heating medium to said drying medium in a manner so as to raise the temperature of said drying medium before passing said drying medium through said dryer means, said circuit means including heat sink means between the high temperature side of said heat exchange means and said radiator means for dissipating heat in said liquid medium upstream from said dryer means.

2. A system according to claim 1 wherein said heat sink means is connected in parallel with said radiator means and includes valve means in said circuit means for selectively shunting flow of said liquid medium to said heat sink means and bypassing said radiator means.

* * * * *